US008728975B2

United States Patent
Zemek et al.

(10) Patent No.: US 8,728,975 B2
(45) Date of Patent: May 20, 2014

(54) METHOD OF PRODUCING A CATALYST BODY CONTAINING URANIUM OXIDE AS ACTIVE COMPONENT

(71) Applicant: Areva GmbH, Erlangen (DE)

(72) Inventors: Martin Zemek, Kleindoettingen (CH); Volker Lansmann, Weisendorf (DE)

(73) Assignee: Areva GmbH, Erlangen (DE)

( * ) Notice: Subject to any disclaimer, the term of this patent is extended or adjusted under 35 U.S.C. 154(b) by 0 days.

(21) Appl. No.: 14/018,623

(22) Filed: Sep. 5, 2013

(65) Prior Publication Data

US 2014/0011668 A1    Jan. 9, 2014

Related U.S. Application Data

(63) Continuation of application No. PCT/EP2012/064583, filed on Jul. 25, 2012.

(30) Foreign Application Priority Data

Aug. 17, 2011    (DE) .......................... 10 2011 081 074

(51) Int. Cl.
*B01J 23/02*    (2006.01)

(52) U.S. Cl.
USPC .......................................... 502/439; 502/100

(58) Field of Classification Search
None
See application file for complete search history.

(56) References Cited

U.S. PATENT DOCUMENTS

| 6,251,309 | B1 * | 6/2001 | Song et al. ..................... 252/643 |
| 6,878,313 | B2 * | 4/2005 | Kobayashi et al. ............ 264/0.5 |
| 7,985,395 | B2 | 7/2011 | Wolf et al. |
| 7,992,811 | B2 * | 8/2011 | Sornay et al. ................... 241/22 |
| 2012/0045386 | A1 | 2/2012 | Wolf et al. |

FOREIGN PATENT DOCUMENTS

| DE | 102007033114 A1 | 1/2009 |
| DE | 102009013905 A1 | 9/2010 |
| GB | 1258413 | 12/1971 |
| GB | 1351803 | 5/1974 |
| WO | 2009010167 A1 | 1/2009 |

OTHER PUBLICATIONS

International Searc Report of PCT/EP2012/064583 Dated Oct. 25, 2012.

* cited by examiner

*Primary Examiner* — Melissa Stalder
(74) *Attorney, Agent, or Firm* — Laurence A. Greenberg; Werner H. Stemer; Ralph E. Locher

(57) ABSTRACT

A method for producing a uranium oxide catalyst body includes the following steps: $UO_{2+x}$ powder, with $x \leq 0.7$, having a purity of at least 50% is sintered in a first sintering process to obtain a $UO_{2+y}$ intermediate, where $y \leq 0.25$. Then the $UO_{2+y}$ intermediate is oxidized with oxygen and converted in the process into a $U_3O_{8-z}$ powder, with $z \leq 1$. The $U_3O_{8-z}$ powder is pressed to form a blank having a shape that corresponds with the catalyst body to be produced. The blank is sintered in a second sintering process at a temperature of at least 900° C. in an oxygen-containing sintering atmosphere.

11 Claims, 3 Drawing Sheets

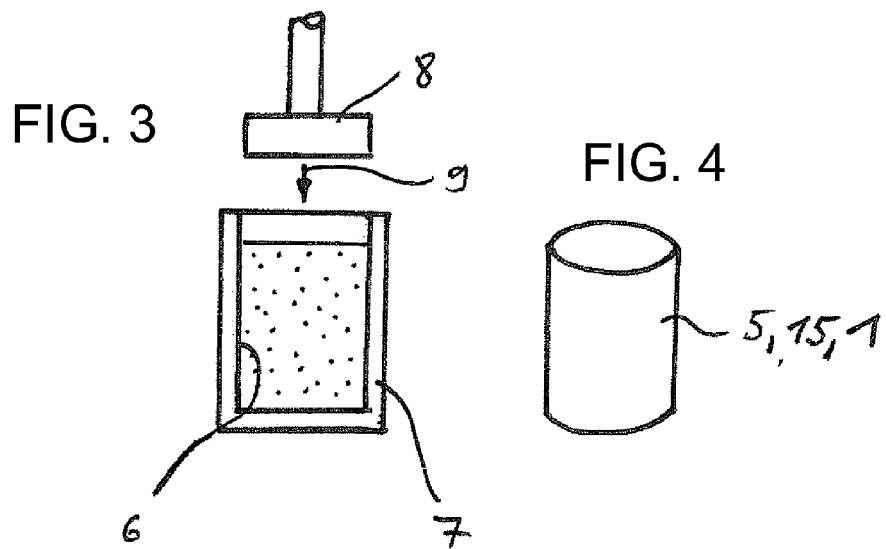

METHOD OF PRODUCING A CATALYST BODY CONTAINING URANIUM OXIDE AS ACTIVE COMPONENT

CROSS-REFERENCE TO RELATED APPLICATION

This is a continuation application, under 35 U.S.C. §120, of copending international application No. PCT/EP2012/064583, filed Jul. 25, 2012, which designated the United States; this application also claims the priority, under 35 U.S.C. §119, of German patent application No. 10 2011 081 074.9, filed Aug. 17, 2011; the prior applications are herewith incorporated by reference in their entirety.

BACKGROUND OF THE INVENTION

Field of the Invention

The invention relates to a process for producing a catalyst carrier containing uranium oxide as an active component. Uranium oxides can be used as oxidation catalyst for a number of oxidation reactions, for example, as disclosed in German published patent application DE 10 2007 033 114 A1, for the total oxidation of volatile organic compounds, of carbon monoxide to carbon dioxide, of isobutene to acrolein, and of hydrogen chloride to chlorine. Catalyst carriers, or catalysts for short, including uranium oxide catalysts, are frequently produced by applying the active component in liquid form, for instance as aqueous suspension of a precursor such as uranyl dihydrate, or in the gas phase by means of CVD (chemical vapor deposition) or PVD (physical vapor deposition) to a carrier body.

SUMMARY OF THE INVENTION

It is an object of the invention to provide a novel process for the production of a uranium oxide catalytic converter which overcomes a variety of disadvantages of the heretofore-known methods and which provides for an alternative production process for a uranium oxide catalyst.

With the foregoing and other objects in view there is provided, in accordance with the invention, a method of producing a uranium oxide catalyst body, the method comprising the following steps:

sintering a $UO_{2+x}$ powder (with $x \leq 0.7$) having a purity of at least 50% in a first sintering stage to obtain a $UO_{2+y}$ intermediate (with $y \leq 0.25$);

oxidizing the $UO_{2+y}$ intermediate with oxygen and thus converting the $UO_{2+y}$ intermediate into a $U_3O_{8-z}$ powder (with $z \leq 1$);

pressing the $U_3O_{8-z}$ powder to obtain a blank having a shape substantially corresponding with the catalyst body to be produced; and sintering the blank at a temperature of at least 900° C. in an oxygen-containing sintering atmosphere in a second sintering stage.

In other words, the invention is based on the general concept of producing a sintered body having a high open porosity from uranium oxide. In contrast to the known production processes in which suitable carrier bodies are first produced from, for example, $Al_2O_3$ and these have to be provided with the active component, according to the invention a catalyst which in itself combines the carrier body and active component is produced. The outlay for production of a carrier body, or support body, and application of the active component thereto becomes unnecessary. In addition, uranium material of the type in question here is weakly radioactive, so that no increased outlay, which would increase production costs, would be required for disposal of, for example, excess precursor suspensions or suspensions which have become unusable or waste which has been obtained in the preparation of a precursor.

In a first sintering process, $UO_{2+x}$ powder (where $x \leq 0.7$), preferably $UO_{2+x}$ powder which has been obtained by chemical transformation of $UF_6$, $UO_3$, UN, UNH, $U_3O_8$, or $UF_4$ in a dry or wet conversion process, is sintered to give a $UO_{2+y}$ intermediate (where $y \leq 0.25$) (step a). The $UO_{2+x}$ powder is preferably used without further additives, for example metal oxides such as $Al_2O_3$ or $ZrO_2$, but can contain up to 50% by weight of such additives. The intermediate is a shaped body having any structure. However, it is also conceivable for the $UO_{2+x}$ powder to be sintered without prior compaction, but this would be impractical for process engineering reasons. It is advantageous to produce an intermediate which has the same shape as the latter end product, i.e. the finished catalyst body. Pressing of an intermediate blank and the pressing as described below of the blank of the catalyst body can then be carried out using one and the same pressing apparatus.

In a subsequent step b), the sintered intermediate is treated with oxygen, resulting in oxidation of $UO_{2+y}$ to $U_3O_{8-z}$ (where $z \leq 1$). Here, the intermediate is converted into a fine $U_3O_{8-z}$ powder which has an average particle size in the range, for example, from 5 μm to 10 μm or typically in the range from 1 to 30 μm and a sintering activity which is reduced compared to the starting $UO_2$ powder. The powder particles of the starting $UO_2$ powder, which can, for example, have particle sizes of from 5 μm to 500 μm, are each made up of a plurality of small crystallites having crystallite sizes in the range, for example, from 50 nm to 300 nm, which means a relatively high sintering activity which favors the production of dense sintered bodies having a low porosity. In the process of the invention, the crystallites initially present coalesce during the first sintering process to form larger crystallites/grains, so that up to 600-fold larger crystallites, namely crystallites having crystallite sizes of from 1 μm to 3 μm, are present after the first sintering process and likewise after the oxidation in step b), which is more favorable for a high porosity or low density of the sintered body to be produced therewith. However, a further significant effect might also be due to the fact that the density of $U_3O_{8-z}$, which has an orthorhombic crystal structure, is lower than that of the cubic $UO_{2+y}$, so that the oxidation results in an increase in the volume of the original $UO_{2+y}$ particles, in which the particles require a large number of cracks and are broken up into smaller constituents. This results in many voids in the particle. As a result, the voids are at least partly retained in the second sintering process and a catalyst body having a high open porosity is formed.

Other features which are considered as characteristic for the invention are set forth in the appended claims.

Although the invention is illustrated and described herein as embodied in method for producing a catalyst body containing uranium oxide as the/an active component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a vertical section showing the production of blanks of a $UO_{2+x}$ intermediate or a $U_3O_{8-z}$ catalyst body;

FIG. 4 is a perspective view of an intermediate green body;

DETAILED DESCRIPTION OF THE INVENTION

Figure 1:
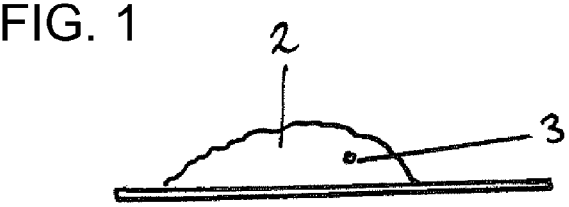
FIG. 1 shows a $UO_{2+x}$ powder (where $x \leq 0.7$) which serves as starting powder for a process according to the invention.
Figure 2:
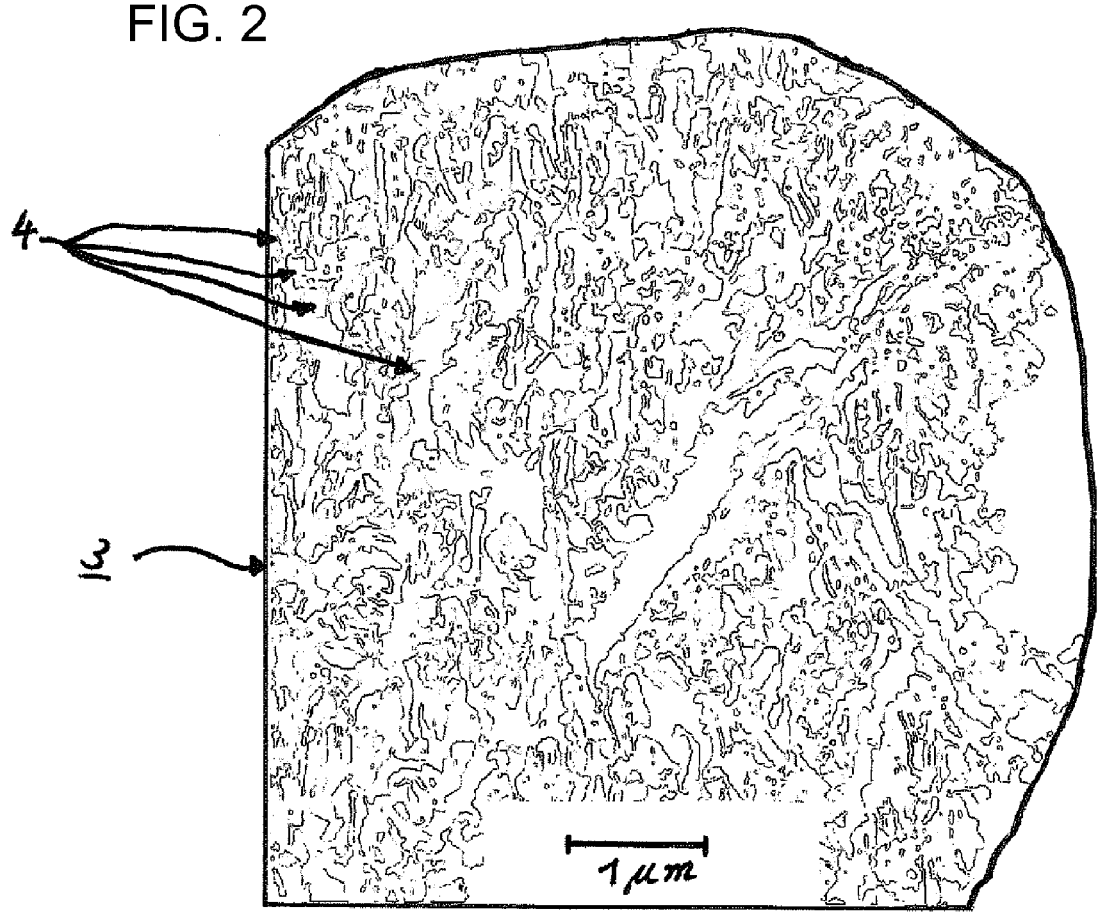
FIG. 2 is a magnified view of a $UO_{2+x}$ particle of the starting powder with crystallites.

Referring now to the figures of the drawing in detail to produce a catalyst body, one according to the invention, for example a cylindrical catalyst body 1 according to the invention, $UO_2$ powder 2 is used as starting powder. The starting powder is preferably a powder which has been obtained by wet-chemical or dry-chemical conversion from uranium hexafluoride ($UF_6$), uranium trioxide ($UO_3$), uranyl nitrate (UN), uranyl nitrate hexahydrate (UNH), triuranium octoxide ($U_3O_8$) or uranium tetrafluoride ($UF_4$). Known processes are named according to their intermediates, for example the AUC (ammonium uranyl carbonate) process or the ADU (ammonium diuranate) process. In a dry-chemical conversion process, $UF_6$ is reacted directly with water and hydrogen in the gas phase to form uranium dioxide. A $UO_{2+x}$ powder of the type mentioned usually has powder particles 3 having an average particle size of from 5 µm to 500 µm, but frequently in the range from 10 µm to 150 µm. The powder particles themselves are in turn agglomerates of a large number of crystallites 4 having a size in the range, for example, from 50 nm to 300 nm. The individual $UO_{2+x}$ particle 3 is thus effectively a microstructure composed of a large number of differently oriented crystallites.

In a first process step (step a), the $UO_{2+x}$ powder is firstly sintered in a first sintering process. Preference is given to using depleted $UO_{2+x}$ which is obtained as an unusable residue in uranium enrichment in the course of the production of nuclear fuel pellets for nuclear power stations. The $UO_{2+x}$ powder 2 is pressed to form, for example, a cylindrical blank 5; for this purpose, it is introduced into a die 7 having a cylindrical hollow space 6 and compacted to a density of typically from 5 to 7 g/cm$^3$ by means of a punch 8 which is introduced in the direction of the arrow 9 into the die 7 (FIG. 3). It is also possible to use other compaction processes, e.g. biaxial pressing, isostatic pressing, etc., and accordingly other degrees of compaction. The theoretical density of $UO_{2+x}$ is about 11 g/cm$^3$. Sintering of the blank 5 is carried out in a furnace (not shown) so as to give $UO_{2+y}$ (where $y \leq 0.25$). In order to ensure this, sintering is, for example, carried out at from 1500° C. to 1800° C. in an $H_2$-containing atmosphere or at from 1100° C. to 1200° C. in a $CO_2$-containing atmosphere. After sintering, a, for example cylindrical, $UO_{2+y}$ sintered body is then present as intermediate 14 (FIG. 4).

Figure 5:
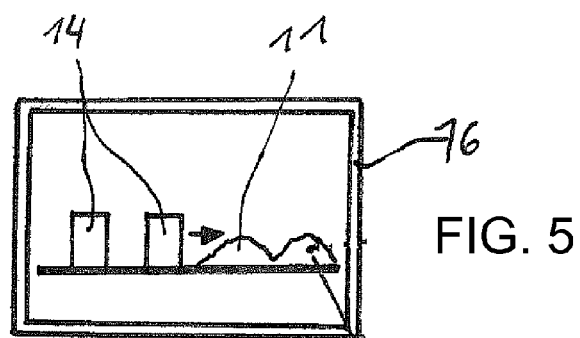
FIG. 5 illustrates an oxidation process of a $UO_{2+y}$ intermediate (where $y \leq 0.25$) by means of oxygen.
Figure 6:
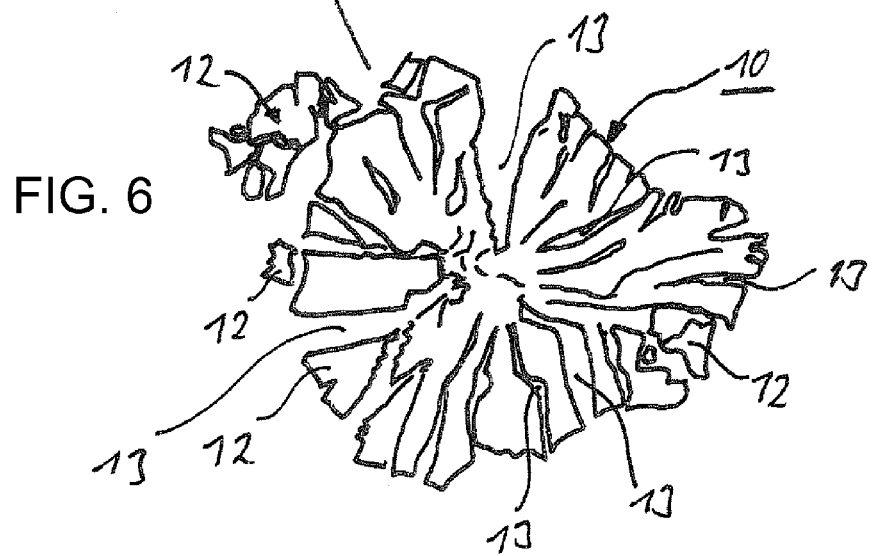
FIG. 6 shows a $U_3O_{8-z}$ particle (where $z \leq 1$) formed from a $UO_{2+y}$ particle by oxidation.

In a subsequent process step (step b), the intermediate 14 is oxidized to $U_3O_{8-z}$ (where $z \leq 1$) in a furnace 16, for example immediately after sintering in the furnace used for the first sintering process, resulting in it disintegrating into $U_3O_{8-z}$ powder 11. The shape of the intermediate 14 is therefore immaterial. When the same shape as for the end product, viz. the catalyst body 1, is selected for the intermediate 14, pressing of the respective blanks can be carried out using one and the same apparatus (die 7, punch 8). The effect of the first sintering process is that the $U_3O_{8-z}$ powder obtained in the subsequent oxidation has a lower sintering activity, which promotes the production of less dense sintered bodies having high porosities. A further effect is due to the fact that $U_3O_8$ has a density of 8.38 g/cm$^3$ and therefore has a lower density than $UO_2$, which leads to the $U_3O_{8-z}$ particles 10 formed from $UO_{2+y}$ expanding, resulting in them partly disintegrating into fragments 12 and forming voids 13, for instance in the form of cracks, in their interior (see FIG. 5). The oxidation is typically carried out at temperatures of from 300° C. to 600° C. over a period of, for example, 3 hours.

In a further process step (step c), the $U_3O_8$ powder 11, as described above, is, for example, uniaxially pressed to give blanks 15 having a density of typically from 5 g/cm$^3$ to 6 g/cm$^3$ and a shape corresponding to the shape of the future catalyst body 1. It is also possible to employ other compaction processes, e.g. biaxial pressing, isostatic pressing, etc., and other degrees of compaction. The catalyst body 1 is, for example, a cylinder having a diameter of 7 mm and a height of 10 mm. A pressing aid, e.g. 0.2% by weight of polyethylene wax, can be added to the $U_3O_{8-z}$ powder before pressing. A pressing aid can also be used in the production of the intermediate 14.

The blanks 15 obtained in the above-mentioned way are sintered in a second sintering process (step d) which is carried out in an atmosphere in which the $U_3O_8$ composition range remains unchanged. An atmosphere which ensures this contains oxygen or consists of air, with a temperature of from 1000° C. to 1300° C. being maintained during sintering. At the end, a catalyst body 1 having a high open porosity and accordingly a large internal surface area at which catalytic reactions can take place is obtained.

$U_3O_{8-z}$ catalyst bodies 1 produced in the above-described way are stable in air up to about 1000° C.-1200° C. For use under reducing conditions, a catalyst body can be treated reductively in an $H_2$-containing atmosphere, e.g. $H_2$, $H_2$—$N_2$, $H_2$—Ar, etc., at temperatures of from 300° C. to 1000° C., preferably from 400° C. to 600° C., in order to convert $U_3O_{8-z}$ into $UO_2$. Although $UO_2$ is stable up to only about 120° C. in air, under reducing conditions it is stable as porous body up to about 1000° C.

EXAMPLES

Cylindrical $UO_2$ intermediates 14 produced in the manner indicated above were oxidized at 450° C. for 3 hours. The $U_3O_8$ powder formed here was mixed with 0.2% of pressing aid (PE wax) and pressed to give cylindrical blanks 15 having a density of from 5 g/cm$^3$ to 5.5 g/cm$^3$ and a weight of 1 g. The blanks 15 were then sintered at 1280° C. (batch A) or at 1100° C. (batch B) for one hour in a furnace using air as sintering atmosphere. Catalyst bodies 1 having the following properties could be obtained in this way:

|  | Batch A | Batch B |
| --- | --- | --- |
| Density [g/cm$^3$] | 7.15-7.20 | 6.67-6.97 |
| Open porosity [%] | 91-92 | 92-96 |
| Specific surface area [m$^2$/kg] | 140 | 250 |
| Average grain size [µm] | 4.2 | 2.2 |

The open porosity is reported as a proportion of the total porosity, with the total porosity (% by volume) being given by: total porosity=(1−density/theoretical density)×100. The theoretical density of $UO_2$ is 10.96 g/cm³, while that of $U_3O_8$ is 8.38 g/cm³.

The invention claimed is:

1. A method of producing a uranium oxide catalyst body, the method comprising the following steps:
    a) sintering a $UO_{2+x}$ powder having a purity of at least 50% in a first sintering stage to obtain a $UO_{2+y}$ intermediate, wherein x≤0.7 and y≤0.25;
    b) oxidizing the $UO_{2+y}$ intermediate with oxygen and thus converting the $UO_{2+y}$ intermediate into a $U_3O_{8-z}$ powder, wherein z≤1;
    c) pressing the $U_3O_{8-z}$ powder to obtain a blank having a shape substantially corresponding with the catalyst body to be produced; and
    d) sintering the blank at a temperature of at least 900° C. in an oxygen-containing sintering atmosphere in a second sintering stage to produce the uranium oxide catalyst body with open porosity.

2. The method according to claim 1, which comprises, prior to step a), obtaining the $UO_{2+x}$ powder by a conversion of $UF_6$, $UO_3$, UNH, $U_3O_8$ or $UF_4$.

3. The method according to claim 1, wherein the $UO_{2+x}$ powder in step a) has powder particles with an average particle size of from 5 μm to 500 μm.

4. The method according to claim 3, which comprises using a $UO_{2+x}$ powder having an average particle size of from 10 μm to 150 μm.

5. The method according to claim 1, which comprises using a $UO_{2+x}$ powder formed of powder particles made up of crystallites having an average size of from 30 nm to 300 nm.

6. The method according to claim 1, which comprises carrying out the step of oxidizing the $UO_{2+y}$ intermediate at a temperature of at least 300° C.

7. The method according to claim 6, which comprises setting an oxidation temperature between 400° C. and 500° C.

8. The process according to claim 1, which comprises sintering the blank of the catalyst body at a temperature from 900° C. to 1300° C.

9. The process according to claim 1, which comprises reducing the catalyst body in order to convert $U_3O_{8-z}$ into $UO_2$ after step d).

10. The process according to claim 9, which comprises carrying out the reducing step at a temperature between 300° C. and 1000° C.

11. The process according to claim 10, which comprises carrying out the reducing step at a temperature between 400° C. and 600° C.

* * * * *